May 18, 1965   R. A. L. THIRION   3,184,005
CALIPER, SPOT-TYPE DISC BRAKE
Filed Jan. 8, 1963   2 Sheets-Sheet 1
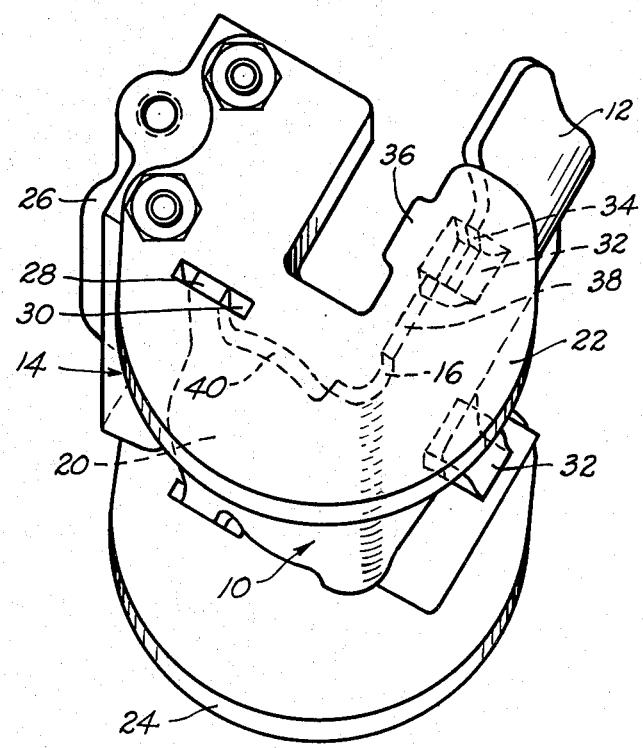
FIG_1
INVENTOR.
RENÉ ALPHONSE LOUIS THIRION.
BY
*Sheldon F. Raijes*
ATTORNEY.

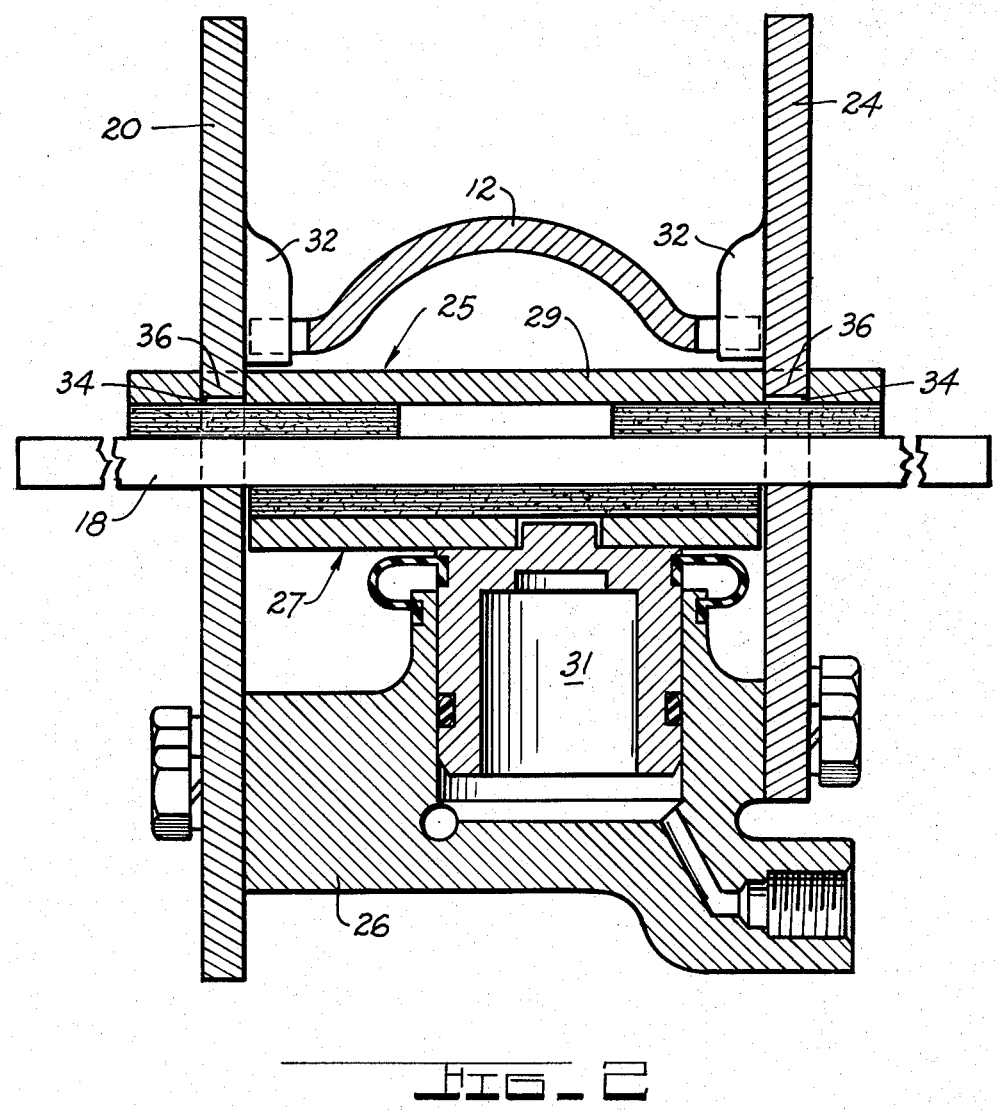

United States Patent Office 3,184,005
Patented May 18, 1965

3,184,005
CALIPER, SPOT-TYPE DISC BRAKE
René Alphonse Louis Thirion, Paris, France, assignor to Societe Anonyme D.B.A., Paris, France, a company of France
Filed Jan. 8, 1963, Ser. No. 250,145
Claims priority, application France, Feb. 1, 1962, 886,596
4 Claims. (Cl. 188—73)

The invention relates to spot type disc brakes comprising a caliper straddling the periphery of a rotatable disc and carrying two friction members disposed on opposite sides of the disc, and a fixed support member restraining the caliper against circumferential movements but allowing the caliper to move axially to bring one of the friction members in engagement with the adjacent face of the disc, upon actuation of applying means carried by the caliper, and urging the other friction member against the other face of the disc. More particularly the present invention relates to disc brakes in which the caliper is formed of two circumferentially spaced yoke members straddling the periphery of the disc and interconnected on both sides of the disc by brace members.

In disc brakes of the above described type, the tangential braking forces to which the friction members are subjected during braking operation are first transmitted to the caliper and then from the caliper to the fixed support member through one or the other of the yoke members, according to the direction of disc rotation, which bears against anchoring surfaces provided on the fixed support member. In prior brake constructions the zones of engagement of the yoke members and respective anchoring surfaces were generally in the midplane of the disc. Although prior constructions appear advantageous because the forces exerted by the friction members on the yoke members during braking are located on opposite sides of the disc at generally the same distance from the midplane of the disc, test results effected on these prior brakes have shown that the yoke members were so distorted during braking as to cause unsatisfactory brake operation under some conditions.

The object of the present invention is to remedy this drawback of the prior brake constructions. This object is achieved by providing anchoring surfaces for the yoke members in close proximity of the friction member which is brougt into engagement with the disc by the caliper. Calculation and test results show that in a brake made in accordance with the invention the stresses and subsequent distortion of the yoke members are less than in prior brakes. When braking efforts are important, it is advantageous to provide abutment surfaces formed on a portion of the fixed support extending beyond the periphery of the disc transversely thereto to limit the distortion of the yoke members.

FIGURE 1 of the accompanying drawing is a perspective view of a disc brake similar to that described in French Patent No. 1,289,454 which corresponds to U.S. application Serial No. 150,508, filed on November 6, 1961. For clarity sake some parts of this brake have not been shown in this figure.

FIGURE 2 is a section view of FIGURE 1 including the parts of the brake not shown in FIGURE 1.

The brake shown in the drawing comprises a support plate 10 adapted to be secured at its extremity 12 to a wheel knuckle or axle, and a caliper 14 adapted to slide on the support plate 10 in a direction parallel to the wheel axis. The support plate 10 is L-shaped and has a vertical leg 16 generally parallel to the disc 18 (shown in phantom lines in the drawing) and a horizontal leg 20 extending beyond the periphery of the disc 18 transversely thereof. The caliper 14 is formed of two C-shaped yoke members 22 and 24, cut from sheet metal, interconnected by the body of an hydraulic motor 26, acting as a brace member, disposed on the side of the disc opposite to that adjacent to the vertical leg 16 of the support plate.

The yoke members 22 and 24 are disposed adjacent the lateral edges of the support plate 10, generally perpendicularly thereto, and are supported by lugs 28 provided on the leg 20 of the support plate and which are received in elongated openings 30 formed in the yoke members. The axial length of these openings is larger than the axial width of the lugs so that the caliper 14 is allowed to move axially with respect to the support plate. Stamped bosses 32 formed on the portion of the yoke members adjacent the leg 16 of the support plate are slidably received in notches 34 cut in the support plate and also serve to support the caliper 14 and to guide its axial movements.

The yoke members 22 and 24 carry friction members 25 and 27 disposed on opposite sides of the disc 18. The friction member 25 is disposed between the leg 16 of the support plate and the disc 18 and is attached to the yoke members through the intermediary of tenons 36 provided on the yoke members and which are fitted in recesses of a backing plate 29 of the friction member 25. The friction member 27 is attached to the piston 31 of the hydraulic motor 26 and is adapted to move axially with respect to the yoke members.

During braking operation, the friction member 25 which is attached to the yoke members transmits a fraction of the force exerted thereon to each yoke member, while the friction member 27 which is attached to the piston 31 of the hydraulic motor 26 transmits the force exerted thereon to one or the other yoke member according to the direction of disc rotation. The forces exerted on the yoke member located at the trailing end of the caliper are transmitted through the body of the hydraulic motor to the yoke member located at the leading end of the caliper and the forces exerted on the latter yoke member are directly transmitted by the yoke member to an anchoring surface 38 formed on the lateral edge of the leg 16 of the support plate.

When the tangential braking forces on the friction members are large the yoke member located at the leading end of the caliper is brought into engagement with an abutment surface 40 formed on the lateral edge of the leg 20 of the support, which is generally symmetrical with respect to the midplane of the disc, and transmits to the leg 20 a fraction of the total force to which it is subjected.

In the order that the greater fraction of the total force exerted on the friction members during braking be transmitted to the leg 16 of the support plate, the anchoring surfaces 38 are spaced one from the other a somewhat larger distance than the abutment surfaces 40. The anchoring and abutment surfaces 38 and 40 are rounded to allow swivelling of the caliper 14 with respect to the support plate.

It was noted that in the brakes of the type disclosed in the above mentioned patent the distribution between the two yoke members of the force exerted on the caliper by the friction members varied within large limits from one brake to the other due to the tolerances on the thickness and spacing of the tenons 36 and on the width and spacing of the openings of the backing plates of the friction members in which the tenons are fitted. In some cases almost the whole force exerted on the caliper is transmitted to the yoke member located at the leading end of the caliper through the friction member attached to the yoke members. In these cases almost the whole braking force is applied to the tenon 36 of the yoke member located at the leading end of the caliper. If the anchoring surface for the yoke member is relatively far from the tenon 36, like in prior constructions, the yoke member will be subjected to large bending moments which will cause abnormal distorting and even rupture of the yoke member. By forming, in accordance with the invention, anchoring surfaces on the lateral edges of the leg 16 of the support plate, which is located close to the friction member attached to the yoke members, the distance between the anchoring surfaces 38 and the tenons 36 is reduced at a minimum and the bending moment on the yoke members is consequently decreased in large proportion.

It must be noted that numerous modifications can be afforded to the described embodiment of the invention without departing from the scope of the invention as defined by the appended claims.

What is claimed is:

1. A disk brake comprising: a rotor having opposed friction surfaces thereon, a fixed support member having a portion thereof extending opposite one of said friction surfaces, a caliper comprising two circumferentially spaced members extending across the outer periphery of said rotor, a brace member located opposite the other rotor friction surface and operatively connected to said circumferentially spaced members, actuating means carried by said brace member, a first friction member located between said actuating means and said other friction surface for engagement therewith, a second friction member located between said support member portion and said one friction surface, means securing said second friction member to said circumferentially spaced members for movement therewith toward and away from said one friction surface, said circumferentially spaced members embracing said support member and being slidably secured thereto, coacting anchoring surfaces located on the circumferentially spaced ends of said support member portion and on said circumferentially spaced members, whereby torque exerted on said second friction member will be transmitted through said circumferentially spaced members to one of said circumferentially spaced anchoring surfaces on said support member portion upon brake application during rotation of said rotor in one direction and to the other of said circumferentially spaced anchoring surfaces on said support member portion upon brake application during rotation of said rotor in the opposite direction.

2. The structure as recited in claim 1 wherein said circumferentially spaced members are generally C-shaped and said means for securing said second friction member to said circumferentially spaced members comprises tenons on said C-shaped members and openings in said friction members receiving said tenons.

3. The structure as recited in claim 2 wherein said support member is L-shaped, the larger leg of the L being said support member portion and the smaller leg of the L extending across the periphery of said rotor, said smaller leg and said C-shaped members having located thereon additional coacting anchoring surfaces.

4. The structure as recited in claim 3 wherein said caliper is slidably secured to each leg of said support member.

References Cited by the Examiner

UNITED STATES PATENTS 3,035,664    5/62    Desvignes et al. _____ 188—73

FOREIGN PATENTS 1,174,269    11/58    France.
1,251,443    12/60    France.

ARTHUR L. LA POINT, *Primary Examiner.*

EUGENE G. BOTZ, *Examiners.*